UNITED STATES PATENT OFFICE.

GEORGE WITTY, OF NEW YORK, N. Y.

CEMENT.

1,336,178.      Specification of Letters Patent.      Patented Apr. 6, 1920.

No Drawing.      Application filed September 12, 1919. Serial No. 323,392.

*To all whom it may concern:*

Be it known that I, GEORGE WITTY, a citizen of the United States, residing at New York, in the county of New York and State of New York, have invented a new and useful Improvement in Processes of Making Cement; and I do hereby declare the following to be a full, clear, and exact description of the invention.

The object of the invention is to provide an improved cement which will be hard, fire-proof, water-proof and a non-conductor of heat and electricity; and to provide further a cement which may be worked smooth or rough-surfaced and which also may be polished, or given a color or tint.

A further object is to provide a cement composition which will be cheap to manufacture and adapted for shipment in dry powder form to be mixed with water for use.

My invention consists of a mixture of pulverized clay, yellow dextrin, marble dust or fine sharp sand, barium sulfate, and barite. In preparing the cement I prefer to use the ingredients thoroughly mixed and in about the following proportions:

50 pounds pulverized clay
20 pounds marble dust or fine sharp sand
20 pounds yellow dextrin
5 pounds barium sulfate
5 pounds barite.

My improved cement can be used for floor covering, artificial marble, artificial brick and other kinds of casting ornamental work.

Having fully described my invention what I claim as new, and desire to secure by Letters Patent is:

1. A cement composition consisting of clay, finely divided rock, yellow dextrin, barium sulfate, and barite.

2. A cement composition consisting of ten parts by weight of pulverized clay, four parts by weight of marble dust, four parts by weight of yellow dextrin, and one part each by weight of both barium sulfate and barite.

In testimony whereof, I have hereunto signed my name to this specification.

GEORGE WITTY.